United States Patent
Sosnowski

(10) Patent No.: US 9,915,081 B2
(45) Date of Patent: Mar. 13, 2018

(54) CONNECTION APPARATUS, SYSTEM, AND METHODS FOR COLLAPSIBLE STRUCTURES

(71) Applicant: NTH Innovations, LLC, Boonton, NJ (US)

(72) Inventor: Blaze Henry Sosnowski, Boonton, NJ (US)

(73) Assignee: NTH Innovations, LLC, Boonton, NJ (US)

( * ) Notice: Subject to any disclaimer, the term of this patent is extended or adjusted under 35 U.S.C. 154(b) by 204 days.

(21) Appl. No.: 14/568,489

(22) Filed: Dec. 12, 2014

(65) Prior Publication Data

US 2015/0167345 A1 Jun. 18, 2015

Related U.S. Application Data

(60) Provisional application No. 61/915,941, filed on Dec. 13, 2013.

(51) Int. Cl.
| | |
|---|---|
| *E04H 15/48* | (2006.01) |
| *E04H 12/18* | (2006.01) |
| *F16B 7/04* | (2006.01) |
| *A45B 19/08* | (2006.01) |
| *A45B 9/00* | (2006.01) |

(52) U.S. Cl.
CPC ............ *E04H 15/48* (2013.01); *A45B 19/08* (2013.01); *A45B 2009/005* (2013.01); *E04H 12/187* (2013.01); *F16B 7/042* (2013.01); *Y10T 403/125* (2015.01)

(58) Field of Classification Search
CPC ..... F16C 11/045; F16C 11/10; F16C 11/0619; E04H 15/48; E04H 15/44; E04H 12/187; E05D 3/18; Y10T 403/32073; Y10T 403/32581; Y10T 403/32409; Y10T 403/32221; Y10T 403/125; A45B 19/08; A45B 2009/005; F16B 7/042
USPC ........ 403/52, 61, 72, 79, 80, 53, 93, 96, 97, 403/98, 300, 116, 345, 347, 359.3, 101
See application file for complete search history.

(56) References Cited

U.S. PATENT DOCUMENTS

| | | | | |
|---|---|---|---|---|
| 2,589,042 A | * | 3/1952 | Brenneman | B25B 27/304 29/227 |
| 2,818,291 A | * | 12/1957 | Corns | B25G 1/04 15/144.1 |

(Continued)

*Primary Examiner* — Theodore V Adamos
(74) *Attorney, Agent, or Firm* — Rita C. Chipperson; Chipperson Law Group, P.C.

(57) ABSTRACT

A collapsible structure connection system and method including an apparatus having a pair of mated ferrules, at least one pivoting pin and at least one slider arm. Each ferrule couples to a rod segment of the structure, the ferrules connecting the rod segments when mated, but allowing the rod segments to rotate into a collapsed structure. The apparatus has a locking system in one example embodiment. The systems include a bracket, at and at least one locking device to fix the rod segments in a preferred configuration. An alternate apparatus and collapsible structure connection system includes a pair of mated ferrules each having a lengthwise slot, a connector arm and pivoting pins. The connector arm rotates around the pivoting pins within the slots of the ferrules, allowing the ferrules to rotate into various positions when selectively connecting and collapsing rod segments.

23 Claims, 8 Drawing Sheets

(56) References Cited

U.S. PATENT DOCUMENTS

| | | | | |
|---|---|---|---|---|
| 2,993,254 A | * | 7/1961 | Larson | E04G 7/24 24/277 |
| 3,521,519 A | * | 7/1970 | Chester | F16B 21/10 29/442 |
| 4,131,378 A | * | 12/1978 | Daws | E05D 3/12 16/287 |
| 4,365,908 A | * | 12/1982 | Thiboutot | F16C 11/04 135/143 |
| 4,527,579 A | * | 7/1985 | Knotter | A45B 9/00 135/74 |
| 4,641,395 A | * | 2/1987 | Banks | A01K 91/08 16/348 |
| 4,806,042 A | * | 2/1989 | Swank | F16B 3/00 403/101 |
| 5,178,583 A | * | 1/1993 | Rankin | B64G 9/00 403/100 |
| 5,217,315 A | * | 6/1993 | Rosane | A61G 1/013 403/100 |
| 5,255,994 A | * | 10/1993 | Stein | A63B 69/3632 403/102 |
| 5,584,311 A | | 12/1996 | Schaefer | |
| 5,681,045 A | * | 10/1997 | Liao | A63B 63/004 273/400 |
| 5,746,533 A | * | 5/1998 | Schmidt | E05D 11/1007 16/319 |
| 5,895,167 A | * | 4/1999 | Chang | E04H 1/1255 135/150 |
| 6,042,297 A | | 3/2000 | Lah | |
| 6,089,247 A | * | 7/2000 | Price | E04H 15/48 135/145 |
| 6,200,060 B1 | | 3/2001 | Vernay | |
| 6,216,717 B1 | | 4/2001 | Chen | |
| 7,017,234 B2 | | 3/2006 | Anderson | |
| 7,438,496 B2 | | 10/2008 | Moore | |
| 2002/0064417 A1 | * | 5/2002 | Feng | G05G 5/06 403/102 |
| 2003/0086752 A1 | * | 5/2003 | LeMole | B60J 7/1204 403/102 |
| 2004/0036222 A1 | * | 2/2004 | Chou | A63B 63/004 273/407 |
| 2009/0057505 A1 | * | 3/2009 | Chen | B62K 15/006 248/185.1 |
| 2013/0243522 A1 | * | 9/2013 | Jordan | F16B 2/12 403/188 |

\* cited by examiner

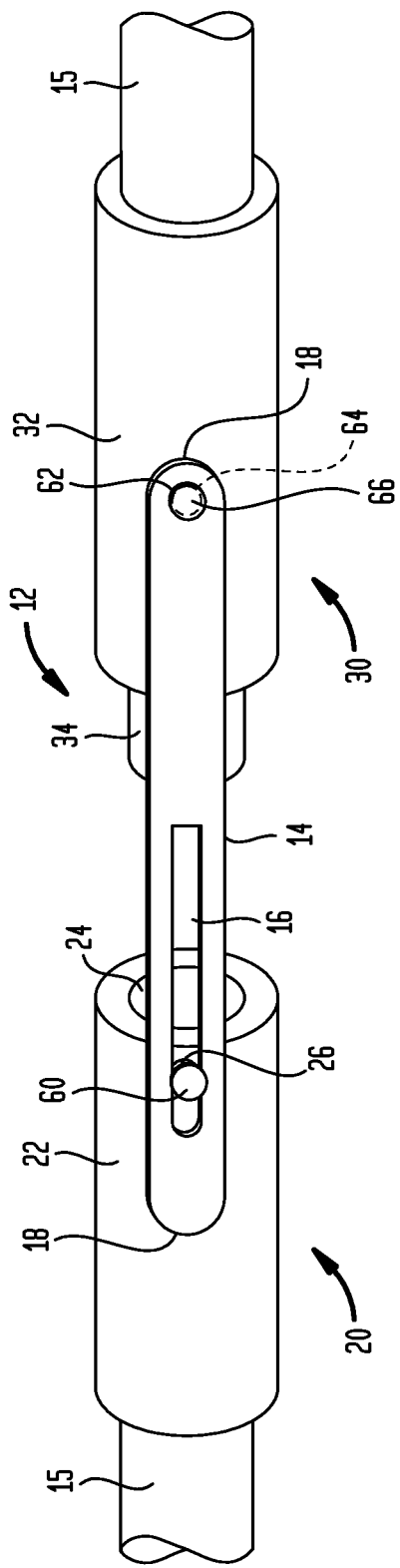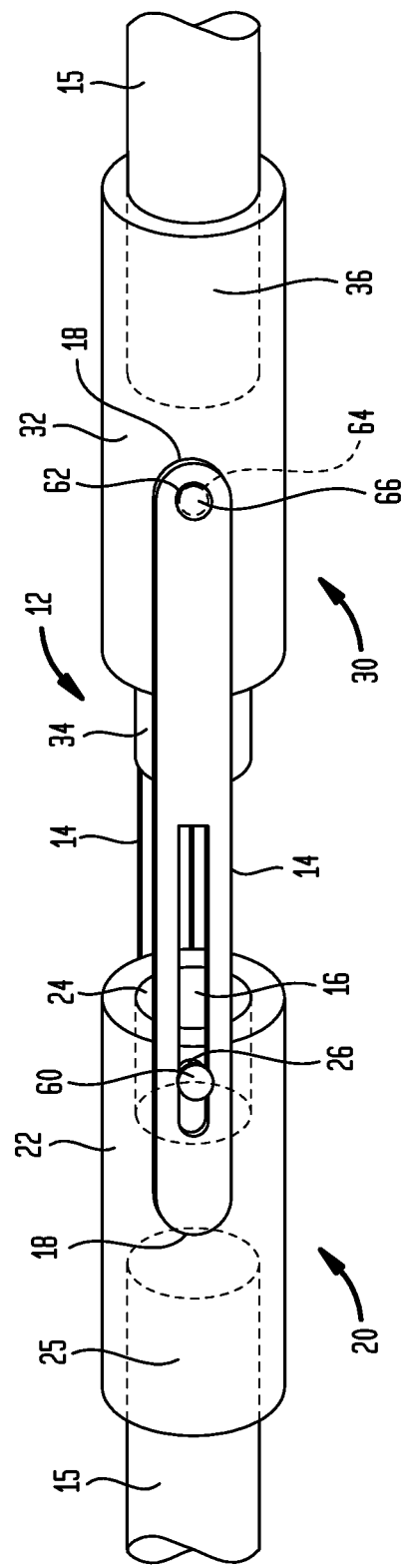

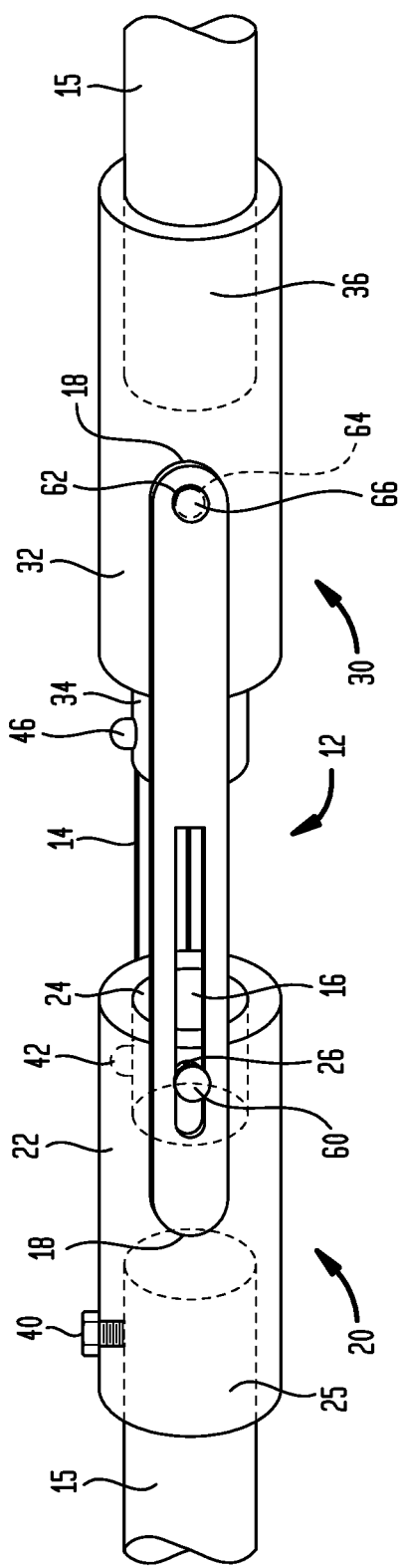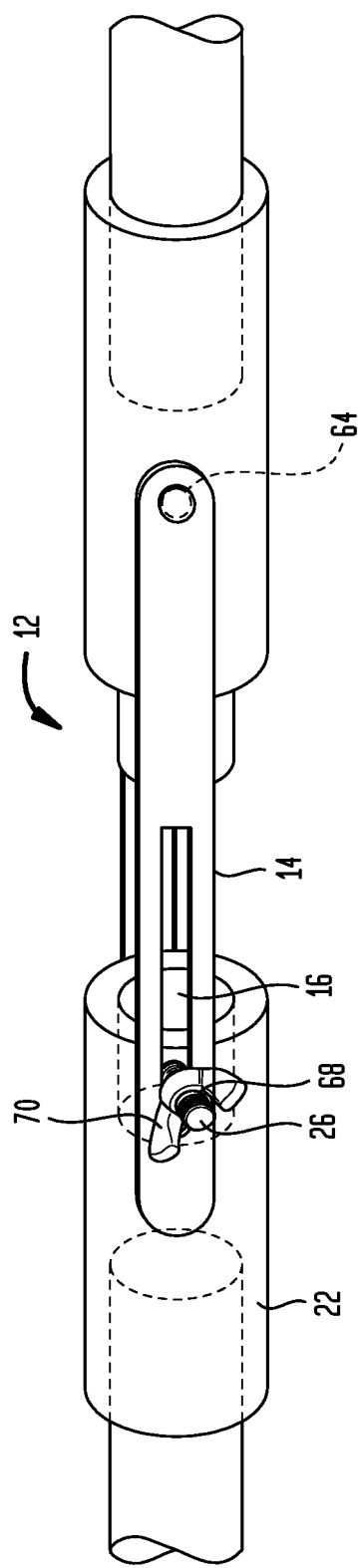

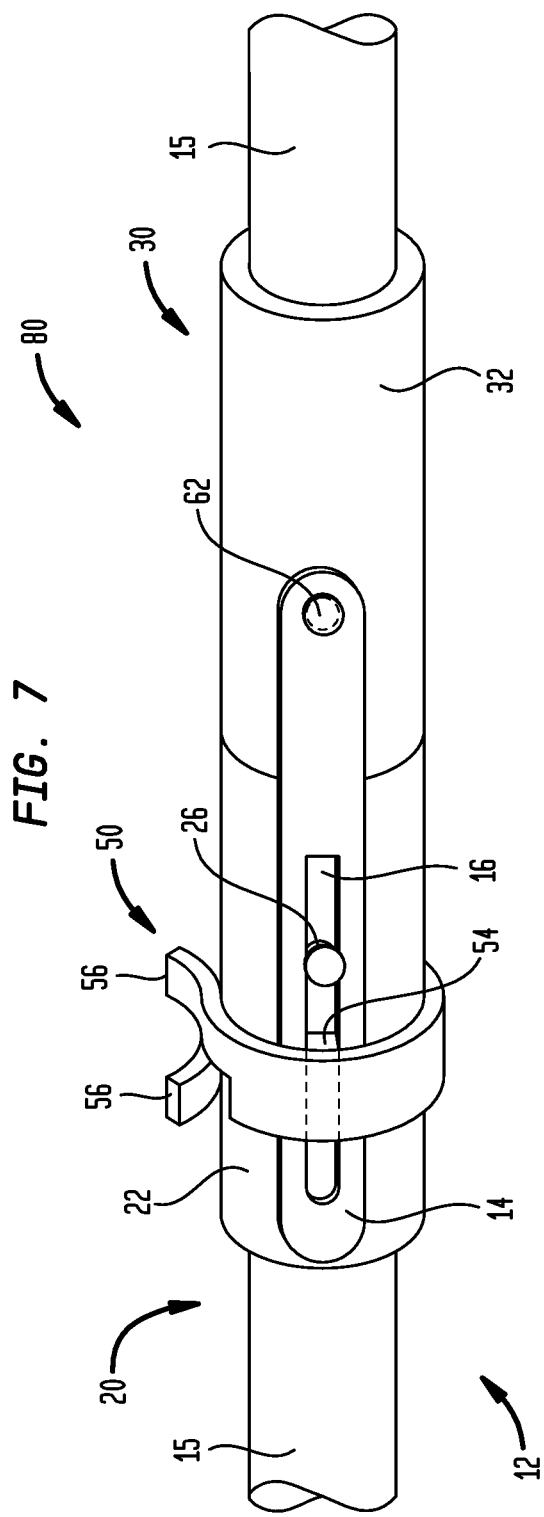
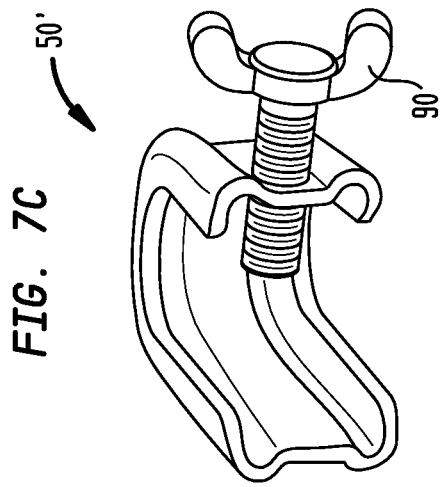
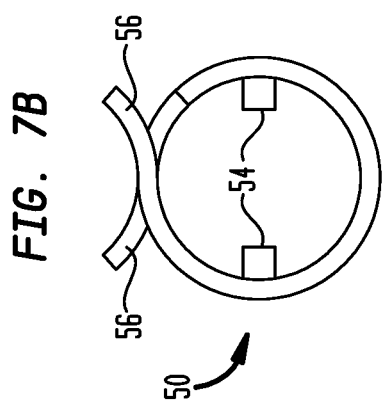
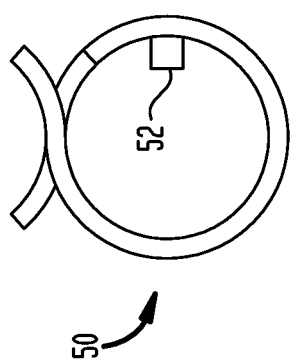

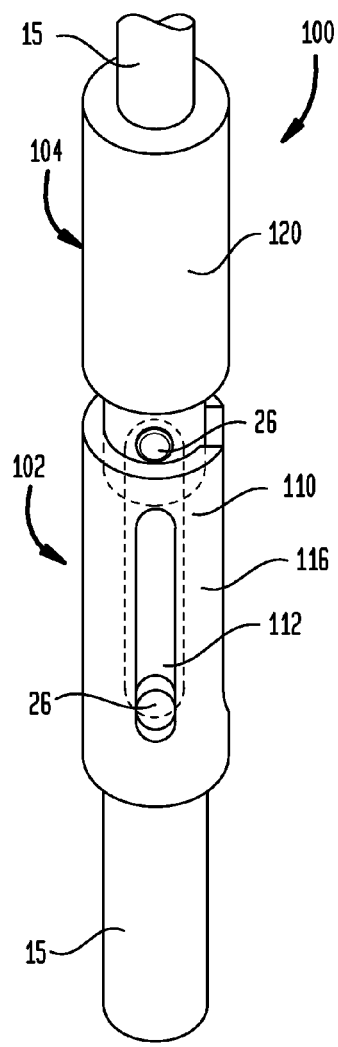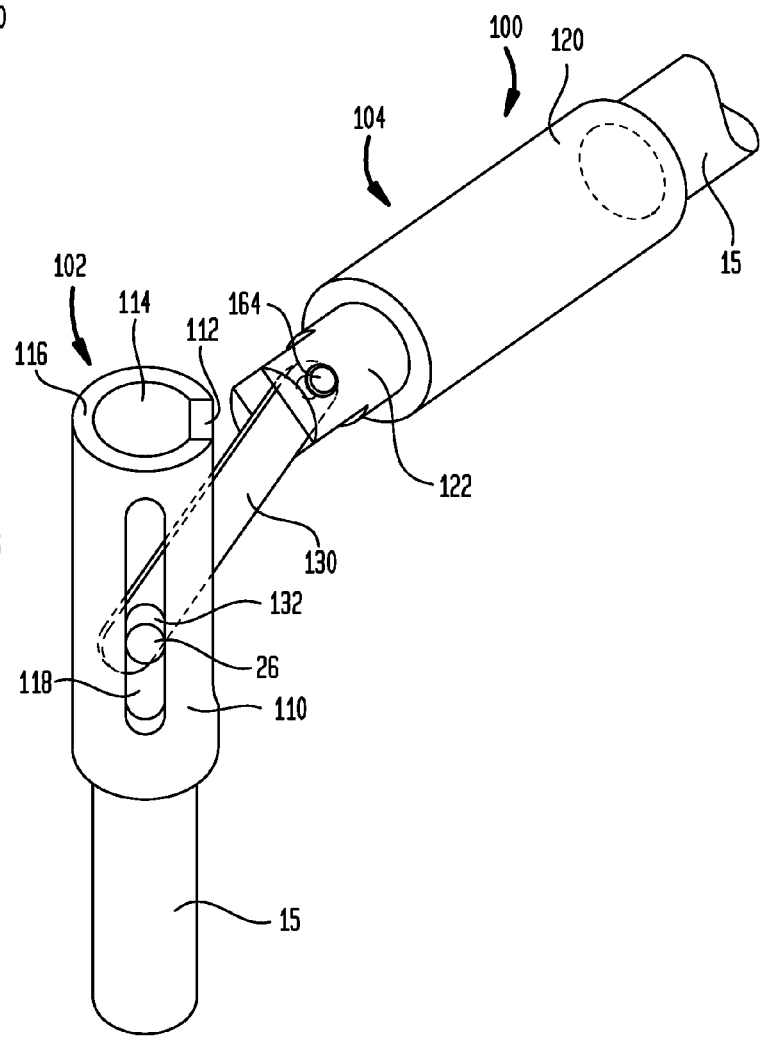

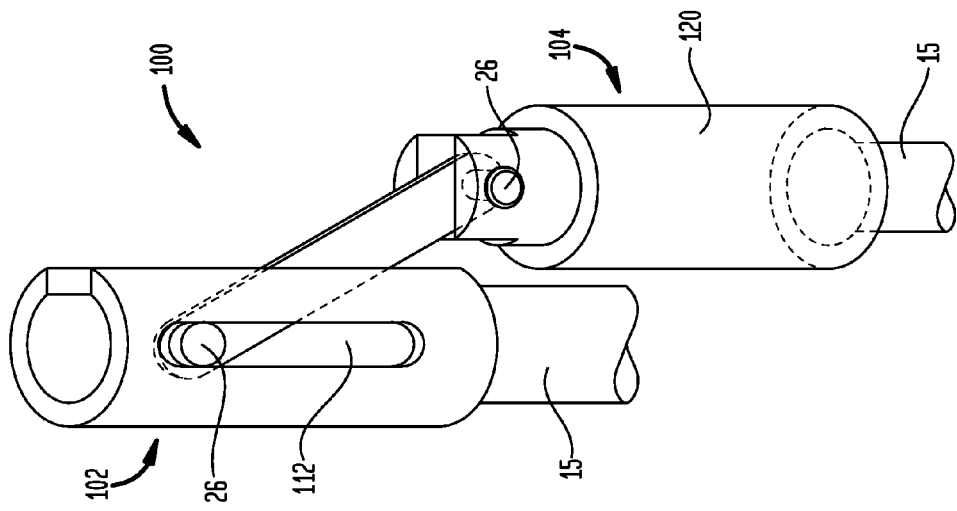
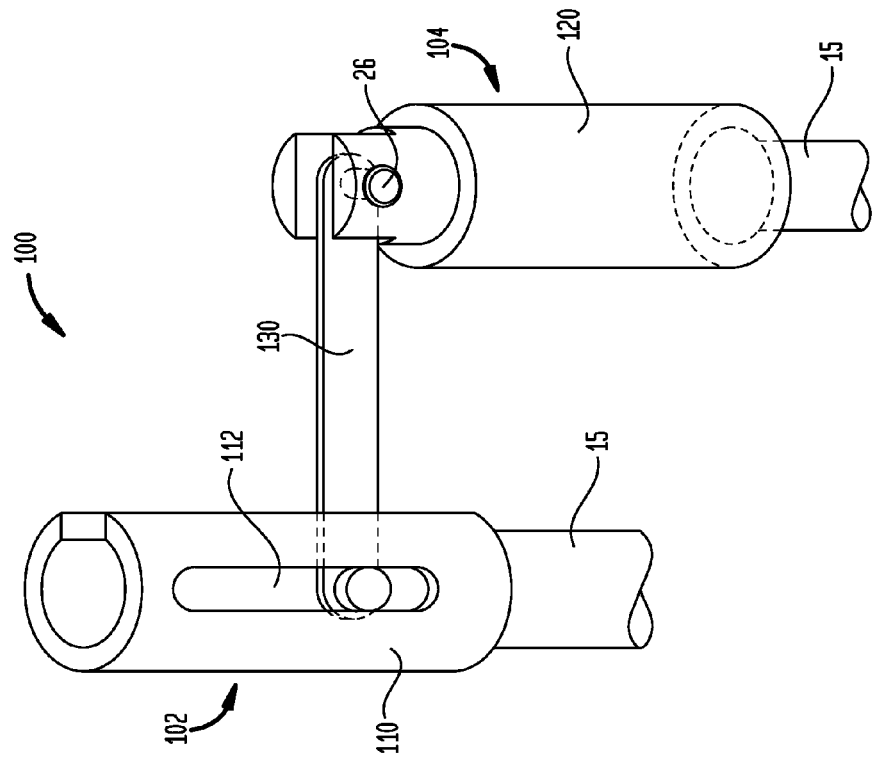

CONNECTION APPARATUS, SYSTEM, AND METHODS FOR COLLAPSIBLE STRUCTURES

CROSS-REFERENCE TO RELATED APPLICATIONS

This application claims the benefit of the U.S. provisional patent application entitled "Connection Apparatus, System, and Methods for Collapsible Structures", having Ser. No. 61/915,941, filed Dec. 13, 2013, which is hereby incorporated by reference in its entirety as if fully set forth herein.

BACKGROUND OF THE INVENTION

Embodiments of the present disclosure generally relate to apparatus, systems, and methods for connecting collapsible structures. More specifically, embodiments of the present disclosure relate to an apparatus, systems and methods for forming a rigid joint between rods or rod segments that selectively collapses when released.

Structures such as tents are intended to be portable, allowing the tent dweller to assemble the structure, dwell within, collapse the structure, pack it up and move it to another site or store it.

Many styles of tents have an internal framework of support poles for the tent skin. It is desirable that the poles be collapsible, having articulated joints, so that the poles fold for easy storage and portability. Additionally, when the poles extend, it is equally desirable that the poles form a rigid support framework.

In addition to tent poles, collapsible connecting rods are found in other temporary structures such as frameworks for canopies (e.g., wedding canopies), gazebos, trellises and kiosks and enclosed spaces, such as temporary and/or semi-permanent utility structures.

Collapsible connecting rods are also useful in walking aids, such as crutches, canes, walking poles, walking sticks and other walking aids. It is especially important that the joint formed between the connecting rods is sufficiently strong and rigid to support the weight of the user, yet collapsible for easy stowing of the walking aid in public places.

Collapsible connecting rods are useful in other diverse areas, such as in the struts of a collapsible airplane wing, and umbrellas, especially beach umbrellas. Additionally, the apparatus, systems, and methods may form tower(s) or pole(s) to support telephone or electrical wire or other materials which need support for proper construction or use, by allowing incremental section(s) to be individually assembled to attain the desired height or width.

BRIEF SUMMARY OF THE INVENTION

Briefly stated, in one aspect of the present invention, an apparatus for connecting rod segments is provided. The apparatus includes: a slider arm having a pair of solid ends and a through slot extending longitudinally through at least a portion of the slider arm and proximal to a first of the pair of solid ends; a rotating assembly having a female ferrule coupling to a first of the rod segments, the female ferrule having a dowel cavity opposite the first rod segment, the rotating assembly having a first pivoting pin, the first pivoting pin passing through the through slot and coupling the female ferrule to the slider arm; and a fixed assembly having a male ferrule coupling to a second of the rod segments, the male ferrule having a dowel opposite the second rod segment configured for mating with the dowel cavity of the female ferrule, the fixed assembly having a second pivoting pin, the second pivoting pin passing through an aperture in a second of the pair of solid ends and coupling the male ferrule to the slider arm; wherein the slider arm and the rotating assembly pivot around the second pivoting pin, the first pivoting pin sliding through the through slot as the dowel inserts into the dowel cavity to connect the first rod segment on the rotating assembly to the second rod segment on the fixed assembly.

Briefly stated, in another aspect of the present invention, a method for connecting rod segments with an apparatus is provided. The method includes: permanently or removably coupling an apparatus to a pair of rod segments, the apparatus including: a slider arm having a pair of solid ends and a through slot extending longitudinally through at least a portion of the slider arm and proximal to a first of the pair of solid ends; a rotating assembly having a female ferrule coupling to a first of the rod segments, the female ferrule having a dowel cavity opposite the first rod segment, the rotating assembly having a first pivoting pin, the first pivoting pin passing through the through slot and coupling the female ferrule to the slider arm; and a fixed assembly having a male ferrule coupling to a second of the rod segments, the male ferrule having a dowel opposite the second rod segment configured for mating with the dowel cavity of the female ferrule, the fixed assembly having a second pivoting pin, the second pivoting pin passing through an aperture in a second of the pair of solid ends and coupling the male ferrule to the slider arm; and inserting the dowel into the dowel cavity to couple the rod segments, the first pivoting pin moving through the through slot during the inserting.

BRIEF DESCRIPTION OF THE SEVERAL VIEWS OF THE DRAWINGS

The foregoing summary, as well as the following detailed description of preferred example embodiments, will be better understood when read in conjunction with the appended drawings. For the purpose of illustrating the invention, there is shown in the drawings example embodiments which are presently preferred. It should be understood, however, that this disclosure is not limited to the precise arrangements and instrumentalities shown. In the drawings:

FIG. 1 is a perspective view of a system and apparatuses for connecting rods having a single slider arm in accordance with an example embodiment of the present disclosure;

FIG. 2 is a perspective view of an alternate example embodiment of a system and apparatuses for connecting rods having two slider arms and removable rod segments in accordance with an example embodiment of the present disclosure;

FIG. 3 is a perspective view of yet another alternate example embodiment of a system and apparatuses for connecting rods having locking mechanisms for coupling a ferrule to a rod segment and for coupling the ferrules to each other in accordance with an example embodiment of the present disclosure;

FIG. 4 is a perspective view of a further alternate example embodiment of a system and apparatuses for connecting rods having a locking mechanism for fixing a ferrule to the slider bar in a fixed position in accordance with an example embodiment of the present disclosure;

FIG. 7 is a perspective view of a system and apparatuses for connecting rods having a locking mechanism for locking the ferrules in place relative to each other in accordance with an example embodiment of the present disclosure;

FIGS. 7*a-c* are perspective views of exemplary locking mechanisms for use with the system and apparatuses for connecting rods;

FIGS. 10 *a-d* are multi-stage views of a method for disconnecting the rods using the system and apparatus of FIG. 9 in accordance with an example embodiment of the present disclosure.

DETAILED DESCRIPTION OF THE INVENTION

Figure 5:
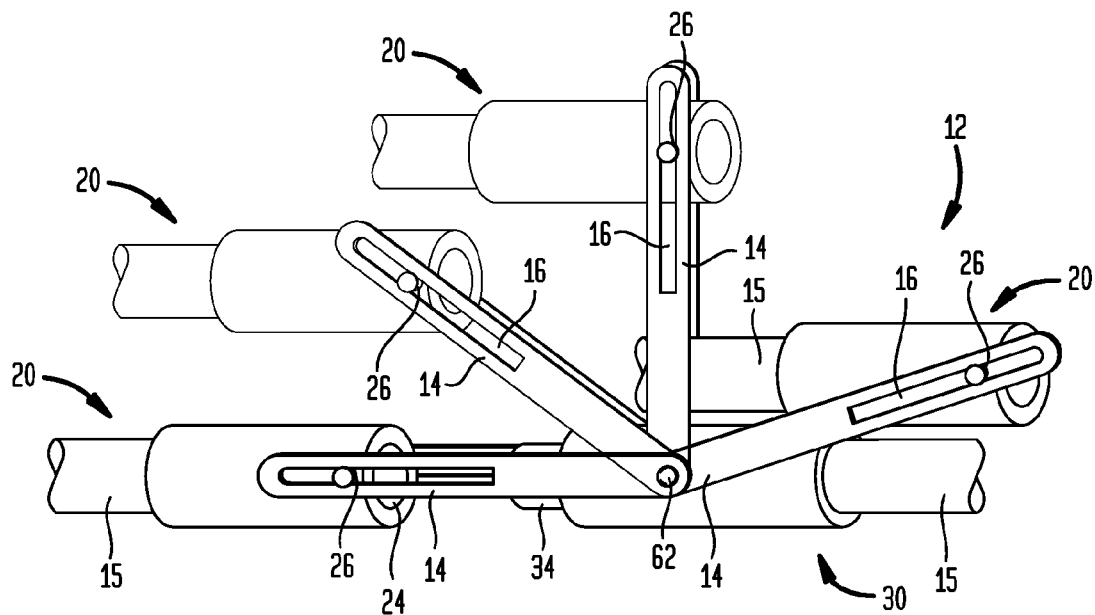
FIG. 5 is a multi-stage view of a method for connecting rods in accordance with one embodiment of the present disclosure.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the disclosure described by the plural of that term. As used in this specification and in the appended claims, the singular forms "a", "an" and "the" include plural references unless the context clearly dictates otherwise, e.g., "an arm" may include a plurality of arms. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Briefly stated, one aspect of the present disclosure is to provide an apparatus for connecting collapsible structures that allows a pair of rod segments of a structure to easily connect. Accordingly, the present disclosure provides an apparatus having a pair of mated ferrules, each ferrule coupled to a rod segment, the ferrules connecting the rod segments when mated.

Another aspect of the present disclosure is to provide an apparatus for connecting collapsible structures that allows the rod segments of a structure to easily collapse and fold for storage. Accordingly, the present disclosure provides an apparatus having a pair of mated ferrules, each ferrule coupled to a rod segment, the ferrules coupled by an arm, the ferrules with the rod segments separating and the arm rotating the ferrule/rod combinations into a collapsed state for storage.

In yet another aspect of the present disclosure, a system for connecting collapsible structures that allows a pair of rod segments of a structure to easily connect and easily collapse is provided. Accordingly, the present disclosure provides a system having an apparatus, a bracket, and a locking device, the apparatus connecting and collapsing the rod segments, the locking device locking the apparatus in a connected position, and the bracket maintaining the rod segments in a collapsed position.

In still another aspect of the present disclosure, a method for connecting collapsible structures that allows a pair of rod segments of a structure to easily connect and easily collapse is provided. This method includes connecting rod segments with mated ferrules that allow the rod segments to rotate from a connected position into a collapsed disconnected position.

The present disclosure describes a collapsible structure connection system, method and an apparatus having a pair of mated ferrules, at least one pivoting pin and at least one slider arm. Each ferrule couples to a rod segment of the structure, the ferrules connecting the rod segments when mated, but allowing the rod segments to rotate into a collapsed structure. The apparatus has a locking system in one example embodiment, locking the ferrules when mated. The system includes a bracket, and at least one locking device to maintain the rod segments in a preferred configuration. An alternate apparatus and collapsible structure connection system includes a pair of mated ferrules each having a lengthwise slot, a connector arm and pivoting pins. The connector arm rotates around the pivoting pins within the slots of the ferrules, allowing the ferrules to rotate into various positions when selectively connecting and collapsing rod segments.

FIG. 1 illustrates an example embodiment of an apparatus 12 for connecting rod segments 15. The apparatus 12 has a pair of assemblies coupled by a slider arm 14, namely, a first rotating assembly 20 and a second fixed assembly 30. Each assembly has a ferrule coupled to a rod segment 15. The ferrules of the assemblies are mated, one assembly having a female ferrule 22 and one assembly having a male ferrule 32. Although the rod segments 15 shown in the accompanying figures have a circular cross section, alternately shaped cross sections may be substituted including, without limitation, square and rectangular.

In the illustrations and as described hereinbelow, the rotating assembly 20 includes the female ferrule 22 and the fixed assembly 30 includes the male ferrule 32. It is understood by those of ordinary skill that the pairing can be reversed and that the rotating assembly 20 can include the male ferrule 32 and the fixed assembly 30 can include the female ferrule 22 within the inventive concept.

In one example embodiment, each ferrule and rod segment 15 is a unitary piece. In another example embodiment, the ferrules couple to the rod segments as disclosed hereinbelow.

As shown in the illustrations, the female ferrule 22 is configured for the rotating assembly 20 and the male ferrule 32 is configured for the fixed assembly 30. The female ferrule 22 has a cavity 24 opposite the rod segment 15 coupled to the female ferrule 22. The male ferrule 32 has a dowel 34 opposite the rod segment 15 coupled to the male ferrule 32. The dowel 34 is configured for snugly inserting into the cavity 24 of the female ferrule 22.

The slider arm 14 has a slot 16 extending lengthwise through the arm 14. The rotating assembly 20 is coupled to the slider arm 14 via a pivoting pin 26, the body of which passes through slot 16, is coupled to female ferrule 22 at a first end, and includes a pin head 60 at a second end. In the depicted embodiment, pin head 60 has a greater diameter than the width of slot 16, thereby preventing dislodgment of pivoting pin 26 from slider arm 14.

The slider arm 14 also has a pair of solid ends 18. The fixed assembly 30 is coupled to slider arm 14 via a pivoting pin 62, the body of which passes through an aperture 64 in the end 16 located proximal to the fixed assembly 30. Pivoting pin 62 is coupled to male ferrule 32 at a first end and includes a pin head 66 at its second end. Pin head 66 has a greater diameter than the width of aperture 64, thereby preventing dislodgment of pivoting pin 62 from slider arm 14. As shown in FIGS. 1-3, pivoting pin 26 and 62 are rivets with one peened head, but alternate embodiments are envisioned in which the pivoting pin has peened heads on both ends and the pins pass through the respective ferrule.

The slider arm 14 with the attached rotating assembly 20 pivots around the pivoting pin 62 of the fixed assembly, the first pin 26 of the rotating assembly 20 sliding through the slider arm slot 16. The rotating assembly 20 rotates until the cavity 24 of the rotating assembly 20 aligns with the dowel 34 of the fixed assembly 30. When thus aligned, the male ferrule dowel 34 inserts into the female ferrule cavity 24 connecting the rod segment 15 on the rotating assembly 20 to the rod segment 15 on the fixed assembly 30. The first and second assemblies are held in such position due to the frictional force exerted by the dowel 34 on the internal walls for the cavity 24 until pressure is exerted by the user to remove dowel 34 therefrom.

The connected rod segments 15 are collapsed by withdrawing the dowel 34 of the male ferrule 32 from the cavity 24 of the female ferrule 22 and rotating the slider arm 14 around the pivoting pin 62 until the rotating assembly 20 is substantially parallel to the fixed assembly 30 as demonstrated more fully hereinbelow.

FIG. 2 illustrates a further example embodiment of the apparatus 12. The apparatus 12 has a second slider arm 14 located on the opposite sides of ferrules 22 and 32 from the first slider arm 14. The second slider arm 14 is identical to the first slider arm 14. The second slider arm 12 couples to the rotating assembly 20 via a second pivoting pin 26 identical to the first pivoting pin 26 but located on the opposite side of female ferrule 22. The second slider arm 14 couples to fixed assembly by a second pivoting pin 62 identical to the first pivoting pin 62 but located on the opposite side of male ferrule 32. Or, alternatively, one pivoting pin 62 may pass fully through male ferrule 32 extending through both slider arm slots 14 and having pin heads 66 at the first and second ends thereof. The second slider arm 14 functions the same as the first slider arm 14, adding stability to the connection of the rod segments 15.

FIG. 2 further illustrates the rod segments 15 selectively coupling to the ferrules. In the depicted embodiment, the female ferrule 22 has an additional cavity 25 longitudinally opposite cavity 24, the rod segment 15 selectively inserting into the additional cavity 25 of the female ferrule 22. The male ferrule 32 has a cavity 36 longitudinally opposite the dowel 34, the rod segment 15 selectively inserting into the cavity 36 of the male ferrule 32. It is understood that other example embodiments are possible, for example, apparatus 12 has two slider arms and each ferrule and each rod segment is a unitary piece.

In yet a further example embodiment of the apparatus 12, FIG. 3 shows the female ferrule 22 sliding over the rod segment 15 and a set screw 40 selectively coupling the female ferrule 22 to the rod segment 15. It is understood to those of ordinary skill, although it is not shown in the drawing, the set screw 40 similarly can couple the male ferrule 32 to the rod segment 15 and/or alternate fastening mechanisms may be substituted without departing from the scope hereof.

Additionally, the example embodiment shown in FIG. 3 locks the rod segments 15 together. The dowel 34 of the male ferrule 32 has a spring loaded ball 46 and the cavity 24 of female ferrule 22 has a corresponding indentation 42 such that when the spring loaded ball 46 is pressed down upon inserting the dowel 34 into the female ferrule cavity 24, the ball 46 extends into the indentation 42 upon contact, locking the rod segments 15 together. Although FIG. 3 depicts a spring loaded ball and indentation, alternate locking mechanisms may be substituted including, without limitation, a spring clip with corresponding indentation for accepting the spring clip.

Yet another alternate embodiment of the present invention is depicted in FIG. 4. In FIG. 4, the pivoting pin 26 has a threaded end 68 in lieu of pin head 60 upon which a fastener 70 may be threaded. Such threading locks slider arm 14 in a fixed position relative to female ferrule 22, thereby minimizing the potential for dowel 34 to dislodge from cavity 24. Although FIG. 4 shows a finger-tightened fastener 70 such as a wing nut as a non-limiting example, alternate fasteners may be substituted including, without limitation, other forms of nuts, a thumb screw, an acorn nut and a lock nut. FIG. 4 only shows one pivoting pin 26 with a fastener 70, but it is understood that one, both or none of the pivoting pins 26 and 62 can be configured with the threaded end 68 and fastener 70. Also, in embodiments incorporating two slider arms, such as that shown in FIG. 2, any one or more of the four pivoting pins 26 and 62, or none, may be configured with the threaded end 68 and fastener 70 without departing from the scope hereof.

FIG. 5 shows a multi-stage view of a method for connecting the rod segments 15 with an apparatus 12, wherein the methods involves rotating the slider arm 14 with the attached rotating assembly 20 around the pivoting pin 62 of the fixed assembly 30, the first pin 26 of the rotating assembly sliding through the slider arm slot 16 until the cavity 24 of the rotating assembly 20 aligns with the dowel 34 of the fixed assembly 20. The dowel 34 inserts into the female ferrule cavity 24 connecting the rod segment 15 on the rotating assembly 20 to the rod segment 15 on the fixed assembly 30 as shown in FIG. 7.

Referring again to FIG. 5, the connected rod segments 15 collapse by withdrawing the dowel 34 of the fixed assembly 30 from the cavity 24 of the rotating assembly 20 and rotating the slider arm 14 around the pivoting pin 62 until the rotating assembly 20 is substantially parallel to the fixed assembly 30. In FIG. 5, the rod segments 15 are pointing in opposing directions. It is understood by those of ordinary skill that the rotating assembly 20 is capable of rotating 180 degrees so that the rotating assembly 20 and fixed assembly 30 are substantially parallel and the rod segments 15 point in the same directions.

FIG. 7 further illustrates a system and method for locking the rod segments 15 of the connecting rod 80 in place by placing a locking device 50 as a brake around the apparatus 12 and through the slot 16 of slider arm(s) 14 of the apparatus, thereby preventing movement of the components of apparatus 12 relative to pivoting pin 26. In the depicted embodiment, locking device 50 is a wire clamp such as a spring band clamp, but alternate locking devices may be substituted without departing from the scope hereof including, without limitation, a spring clamp and a spring clip.

In one example embodiment, the locking device 50 has a pair of handles 56 and at least one pad 54 that fits orthogonally into the slot 16 of slider arm 14, the locking device engaging the female ferrule 22 and the slider arm 14 when the rotating assembly 20 and the fixed assembly 30 are connected, the at least one pad 54 inserted into the slider arm slot 16 between the pivoting pin 26 and the end of slot 16 located proximal to the female ferrule 22 such that further movement of the ferrules is prevented, thereby locking the rotating assembly 20 and the fixed assembly 30 together. Alternatively, the at least one pad 54 inserts into the slider arm slot between the pivoting pin 26 and pivoting pin 62. Further, although one pad is shown, it would be obvious to one of skill in the art that alternate quantities of pads may be substituted without departing from the scope hereof.

In a further example embodiment of the locking device of the system shown in FIG. 7A, the locking device 50 has a tab 52 that inserts orthogonally into the slider slot 16. In yet another example embodiment shown in FIG. 7B, the locking device 50 has a pair of pads configured for the apparatus having a pair of slider arms (for example, the embodiment explained and described above with respect to FIG. 2). In yet a further example embodiment in FIG. 7C, the locking device 50 has a "C" shaped body having a finger tightened fastener 90 passing through the arm of the "C" such that the finger tightening mechanism is located external to the body thereof. In such an embodiment, the body of the locking device 50 fits around the exterior of the ferrules and the fastener 90 may be inserted into the slider arm slot 16 as described hereinabove via activation of the finger tightening mechanism until a point at which the slider arm is tightly coupled to the body of the ferrule. The finger tightening mechanism may also be utilized for removal of locking device 50 from apparatus 12 via reverse threading or the like.

Figure 8A:
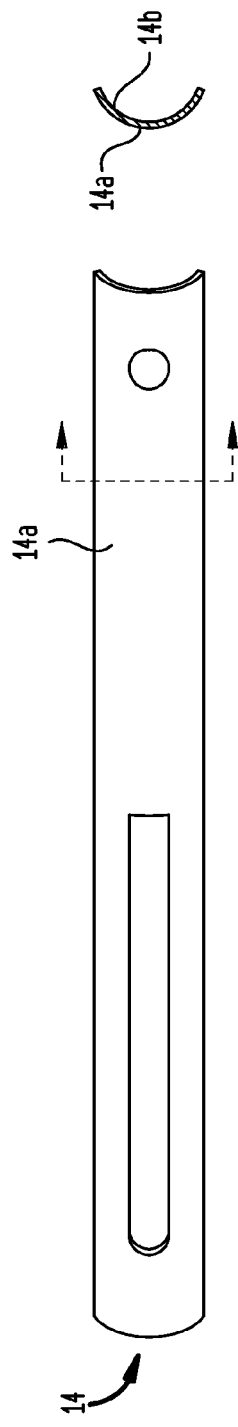
FIGS. 8 *a-c* are perspective views of exemplary slider arms for use with the system and apparatuses for connecting rods.
Figure 8B:
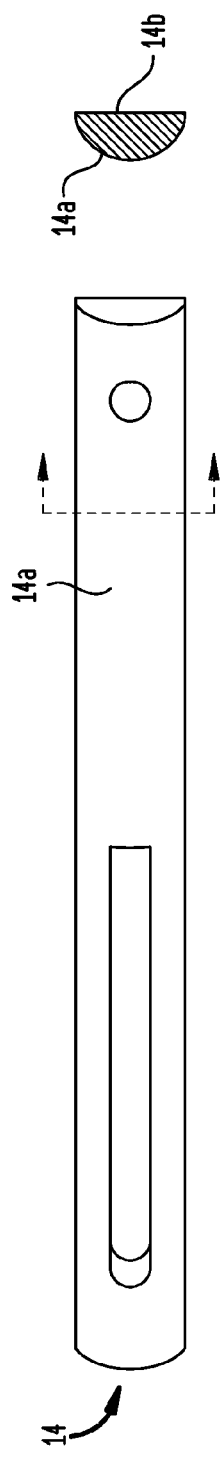
Figure 8C:
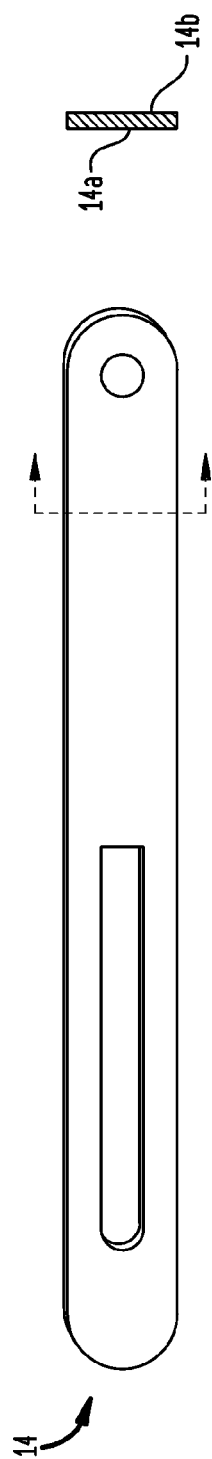

FIGS. 8*a-c* demonstrate some possible shapes of the slider arm 14 of the apparatus and the system in accordance with one embodiment of the present invention. In FIG. 8*a*, the slider arm 14 has arcuate outer and inner surfaces 14*a* and 14*b*, respectively, conforming to the outer surface of the rod segment. FIG. 8*b*, the slider arm 14 has an arcuate outer surface 14*a* and a flat inner surface 14*b*. In FIG. 8*c*, the slider arm 14 has flat outer and inner surfaces 14*a* and 14*b*, respectively. The slider arms may also have some cavities on the top or bottom to accommodate attachment of hooks, snaps, and similar items.

Figure 6:
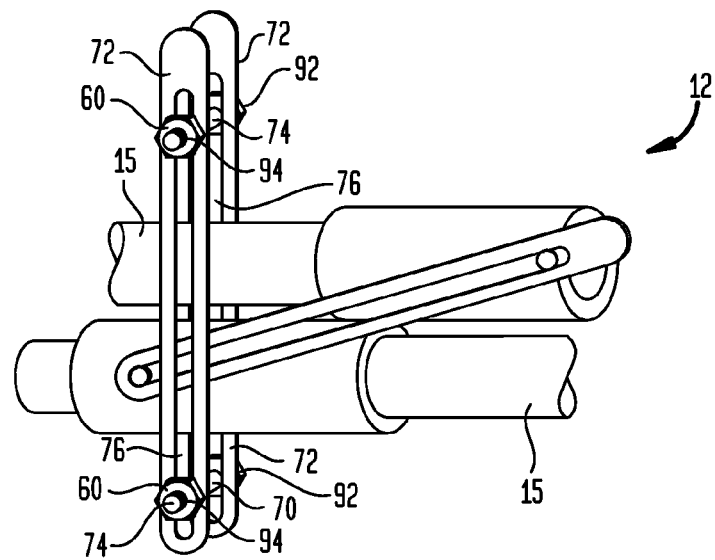
FIG. 6 is a perspective view of a bracket of the system for connecting rods in accordance with one embodiment of the present disclosure.

The system for assembling rod segments in a plurality of configurations further comprises the example embodiments of the apparatus as described herein above, the locking devices as described hereinabove and a bracket 70 as shown in FIG. 6. The bracket 70 has a pair of plates 72, each plate 72 having a longitudinal slot 76. In use, plates 72 are located approximately perpendicular to the substantially parallel rod segments 15 as shown in FIG. 6. Each bracket 70 also includes a pair of bars 74, each bar 74 having a first end with a head 92 and a second threaded end 94 for mating to a screw fastener 60. The first end head 92 has a larger diameter than the width of slot 76 such that when bar 74 is passed through slot 76, head 92 prevents passage of the end therethrough. The bars 74 insert into each end of the slot 76, and fastener 60 is threaded onto threaded end 94 external to plate 72 to tightly couple the substantially parallel connecting rods to each other. That is, the bracket 70 secures the collapsed substantially parallel rod segments 15 together when the rod segments 15 are placed between the bars 74 of the bracket 70, the plates 72 holding the rod segments 15 in an accordion position. Alternate plate types and/or alternate methods of tightening plates 72 to each other may be substituted without departing from the scope hereof.

Figure 9:
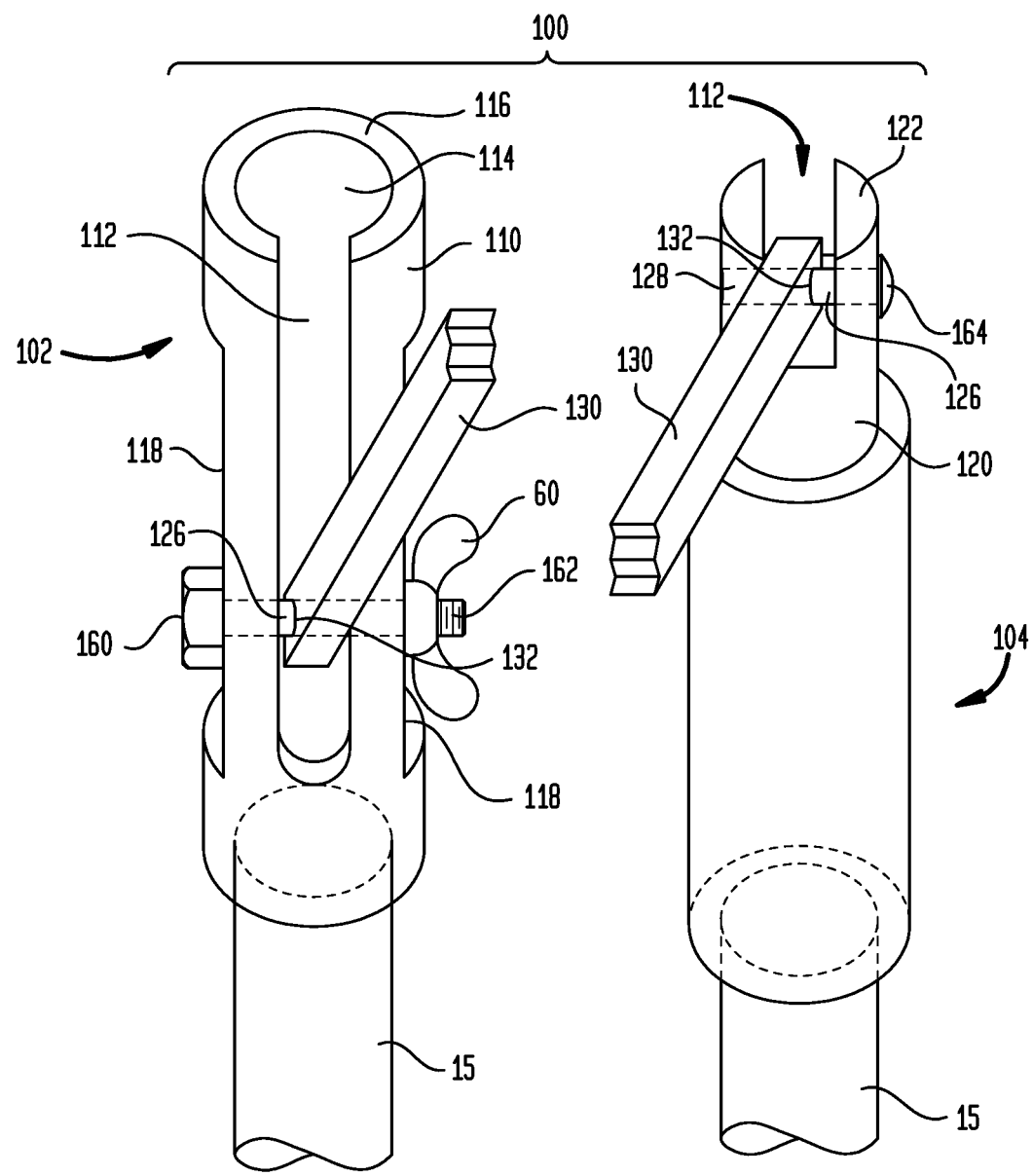
FIG. 9 is an exploded view of a further alternate example embodiment of a system and apparatus for connecting rods in accordance with an example embodiment of the present disclosure.

FIG. 9 illustrates another example embodiment of an apparatus 100 for connecting rod segments 15 in accordance with an alternate embodiment of the present invention. The apparatus 100 has a connector arm 130 fixed at a first end to a first ferrule and slidably engaged at a second end with a second ferrule.

The apparatus 100 has a fixed assembly 102 having a female ferrule 110 coupled to a first rod segment 15, the female ferrule having a wall 116 defining a cavity 114 opposite the first rod segment 15, the wall 116 defining an inner diameter of the female ferrule 110. The female ferrule 110 has a pair of opposing slits 118 in the cavity wall 116. The female ferrule 110 also has a slot 112 on the cavity wall 116 configured for receiving the connector arm 130, the slot 112 substantially equidistant from the slits 118. The connector arm 130 couples to the female ferrule 110 by a pivoting pin 126 that passes through both slits 118 and an opening 132 on the connector arm 130. Pivoting pin 126, a rivet as a non-limiting example, is held within female ferrule 110 via its head 160 located at a first end and a second end having a peened head as a non-limiting example, the heads having a diameter greater than the width of slit 118. Or, as depicted in FIG. 9, pin 126 has a threaded second end 162 coupled to a fastener 60, the fastener 60 also having a diameter larger than the width of slit 118. In the depicted embodiment, fastener 60 is threaded to second end 162. However, alternate fasteners and alternate methods of holding pin 126 within slits 118 may be substituted without departing from the scope of the present invention. The pivoting pin 126 freely traverses the slits 118, and the connector arm rotates around the pivoting pin 126 and freely traverses the slot 112 in the proximity of the slits 118.

The apparatus 100 has a rotating assembly 104 having a male ferrule 120 coupled to a second rod segment 15, the male ferrule 120 having a dowel 122 opposite the second rod segment 15. The dowel 122 defines an outer diameter of the male ferrule 120 slightly less than the inner diameter of the female ferrule 110, the male ferrule 120 configured for snugly inserting into the cavity 114 of the female ferrule. The male ferrule 120 has a pair of opposing openings 128 on the dowel 122 and a slot 112 on the top of the dowel 122 configured for receiving the connector arm 130, the slot 112 substantially equidistant from the openings 128. The connector arm 130 couples to the male ferrule 120 by the pivoting pin 126 extending through the opening 132 on the connector arm 130 and the openings 128 on the dowel 122, the connector arm 130 within the slot 112 and between the dowel walls 122 and freely rotating around the pivoting pin 126. Pivoting pin 126 is held within opening 132 and openings 128 via heads 164 at either end of pivoting pin 126 which have a diameter greater than the diameter of openings 128.

A method of connecting rod segments using the apparatus 100 begins with aligning the rotating assembly 104 with the fixed assembly 102 and inserting the male ferrule 120 into the female ferrule 110 connecting the rod segments 15 as demonstrated in FIG. 10*a*.

FIGS. 10*b* through 10*d* show how the apparatus 100 collapses the connection of the rod segments. The male ferrule 120 withdraws from the female ferrule 110 and the connector arm 130 rotates around the pivoting pins 126, the pivoting pin of the female ferrule 110 traversing the slot 112 of the female ferrule 110 until the rotating assembly 104 is substantially parallel to the fixed assembly 102 as shown in FIG. 10d.

In example embodiment of the apparatus 100, the female ferrule 110 and rod segment 15 are a unitary piece and the male ferrule 120 and rod segment 15 are a unitary piece. In another example embodiment, the ferrules selectively couple to the rod segments. In yet another example embodiment, the ferrules are held in place on the rod segments by set screws as described hereinabove with respect to FIG. 3.

In yet another example embodiment of the apparatus 100, the dowel wall 122 of the male ferrule 120 has a spring loaded ball and the cavity 114 of female ferrule 110 has a corresponding indentation in the cavity wall 116 such that when the spring loaded ball is pressed down upon inserting the male ferrule 120 into the cavity 114, the ball extends into the indentation upon contact, locking the ferrules with the rod segments together as also described hereinabove with respect to FIG. 3.

The apparatus can further comprise the spring band clamps as described hereinabove with reference to FIG. 7. The clamp has at least one tab, the spring band clamp engaging the slot of the female ferrule 110 below the pivoting pin 126 connecting to the connector arm, locking the rotating assembly and fixed assembly together.

In yet a further example embodiment, the male ferrule 122 further comprises a spring clip. The apparatus 12 further comprises a bump out in the cavity 114 of the female ferrule 110, the bump out configured to accept the spring clip of the male ferrule 120 when the dowel 122 of the male ferrule 120 inserts into the cavity 114 of the female ferrule 110, the female ferrule 110 further having a opening configured for accessing the spring clip of the male ferrule 120 when withdrawing the dowel.

Another example embodiment of a system for connecting rod segments includes apparatus 100 and spring band clamp as described hereinabove with respect to FIGS. 7, 7A, and 7B and further comprises the bracket 70 illustrated in FIG. 6.

The depicted connection systems and apparatuses may be used with a variety of collapsible structures including, but not limited to, collapsible tent poles, collapsible frameworks for canopies (e.g., wedding canopies), gazebos, trellises and kiosks, collapsible walking aids (e.g., crutches, canes, walking poles, walking sticks and other walking aids), struts of a collapsible airplane wing, and umbrellas (e.g., beach umbrellas).

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

I claim:

1. An apparatus for connecting rod segments comprising:
   a slider arm having a pair of solid ends and a through slot extending longitudinally through at least a portion of the slider arm and proximal to a first of the pair of solid ends;
   a rotating assembly having a female ferrule having a substantially cylindrical female body, the female ferrule coupling to a first of the rod segments at a first end of the substantially cylindrical female body, the female ferrule having a dowel cavity opposite the first rod segment and recessed in a second end of the substantially cylindrical female body, the rotating assembly having a first pivoting pin extending from an outwardly facing surface of the substantially cylindrical female body, the first pivoting pin passing through the through slot and coupling the slider arm to the female ferrule in a location external to and adjacent a first perimeter of the substantially cylindrical female body of the female ferrule; and
   a fixed assembly having a male ferrule having a substantially cylindrical male body, the male ferrule coupling to a second of the rod segments at the first end of the substantially cylindrical male body, the male ferrule having a dowel opposite the second rod segment coupled to a second end of the substantially cylindrical male body configured for mating with the dowel cavity of the female ferrule, the fixed assembly having a second pivoting pin extending from an outwardly facing surface of the substantially cylindrical male body of the male ferrule, the second pivoting pin passing through an aperture in a second of the pair of solid ends and coupling the slider arm to the male ferrule in a location external to and adjacent a second perimeter of the substantially cylindrical male body of the male ferrule;
   wherein the slider arm and the rotating assembly pivot around the second pivoting pin, the first pivoting pin sliding through the through slot as the dowel inserts into the dowel cavity to connect the first rod segment on the rotating assembly to the second rod segment on the fixed assembly.

2. The apparatus according to claim 1 further comprising:
   a second slider arm having a pair of second slider arm solid ends and a second slider arm through slot extending longitudinally through at least a portion of the second slider arm and proximal to a first of the pair of second slider arm solid ends, said second slider arm located on substantially opposite sides of the substantially cylindrical male body of the male ferrule and the substantially cylindrical female body of the female ferrule from the first slider arm, the second slider arm coupling to the rotating assembly via a third pivoting pin extending from the outwardly facing surface of the substantially cylindrical female body, the third pivoting pin passing through the second slider arm through slot and coupling the slider arm to the female ferrule in a location external to and adjacent the first perimeter of the substantially cylindrical female body of the female ferrule, the second slider arm coupling to the fixed assembly via a fourth pivoting pin extending from the outwardly facing surface of the substantially cylindrical male body, the fourth pivoting pin passing through a second slider arm aperture in a second of the pair of second slider arm solid ends and coupling the second slider arm to the male ferrule in a location external to and adjacent the second perimeter of the substantially cylindrical male body of the male ferrule.

3. The apparatus according to claim 2, wherein the first and third pivoting pins are coupled to each other and the second and fourth pivoting pins are coupled to each other.

4. The apparatus according to claim 2, wherein at least one of the group consisting of the first pivoting pin, the second pivoting pin, the third pivoting pin, and the fourth pivoting pin has a threaded end for mating with a fastener.

5. The apparatus according to claim 1, wherein at least one of the group consisting of the first rod segment and the second rod segment is removably coupled to a respective one of the female ferrule and the male ferrule.

6. The apparatus according to claim 5, wherein at least one of the group consisting of the first rod segment and the second rod segment inserts into a rod cavity located in a respective one of the male ferrule and the female ferrule, wherein the male ferrule rod cavity is located at an end opposite the dowel and the female ferrule rod cavity is located at an end opposite the dowel cavity.

7. The apparatus according to claim 6 further comprising:
at least one set screw passing through a wall of at least one of the group consisting of the substantially cylindrical male body of the male ferrule and the substantially cylindrical female body of the female ferrule;
wherein tightening of the set screw locks at least one of the group consisting of the first rod segment and the second rod segment in the rod cavity; and
wherein loosening of the set screw enables at least one of the group consisting of the first rod segment and the second rod segment to be removed from the rod cavity.

8. The apparatus according to claim 1 further comprising:
a ball cavity recessed in an interior wall of said dowel cavity; and
a spring-loaded ball located on the dowel for inserting into the ball cavity upon insertion of the dowel into the dowel cavity.

9. The apparatus according to claim 1, wherein at least one of the group consisting of the first pivoting pin and the second pivoting pin includes a threaded end for mating with a fastener.

10. The apparatus according to claim 9, wherein the fastener is one of the group consisting of a thumb screw, a wing nut, an acorn nut and a lock nut.

11. The apparatus according to claim 1 further comprising:
a locking device for locking the rod segments in a coupled position.

12. The apparatus according to claim 11, wherein the locking device is at least one of the group consisting of a spring band clamp, a spring clip, and a spring clamp configured to encircle at least one of the male ferrule and the female ferrule.

13. The apparatus according to claim 11, wherein the locking device includes at least one pad located on an interior surface of the locking device, the at least one pad configured to insert into the slider arm through slot when the locking device is mounted on the female ferrule.

14. The apparatus according to claim 1, wherein the slider arm has an outer surface that is selected from the group consisting of arcuate or flat, and the slider arm has an inner surface that is selected from the group consisting of arcuate or flat, wherein a first curvature of the arcuate outer surface or the arcuate inner surface is substantially equivalent to a second curvature of an exterior surface of the substantially cylindrical male body of the male ferrule or the substantially cylindrical female body of the female ferrule.

15. An apparatus according to claim 1 further comprising:
a bracket having a pair of plates, each plate having a plate longitudinal through slot having a first plate slot end and a second plate slot end, each bracket having a pair of bars, each bar having a first bar end with a bar head and a second threaded bar end with a mating bar fastener, a first of the pair of bars passing through the first plate slot ends of the pair of plates, a second of the pair of bars passing through the second plate slot ends of the pair of plates;
wherein disassembled rod segments are placed between the pair of plates in a desired configuration; and
wherein the disassembled rod segments are held in place via tightening of each of the bar fasteners to each of the second threaded bar ends.

16. The apparatus according to claim 1, wherein at least one of the group consisting of the dowel and the dowel cavity have substantially circular cross sections.

17. The apparatus according to claim 1, wherein the dowel is held within the dowel cavity via the frictional force exerted by the dowel on an internal wall of the dowel cavity.

18. A method for connecting rod segments with an apparatus, comprising:
permanently or removably coupling an apparatus to a pair of rod segments, the apparatus including:
a slider arm having a pair of solid ends and a through slot extending longitudinally through at least a portion of the slider arm and proximal to a first of the pair of solid ends;
a rotating assembly having a female ferrule having a substantially cylindrical female body, the female ferrule coupling to a first of the rod segments at a first end of the substantially cylindrical female body, the female ferrule having a dowel cavity opposite the first rod segment and recessed in a second end of the substantially cylindrical female body, the rotating assembly having a first pivoting pin extending from an outwardly facing surface of the substantially cylindrical female body, the first pivoting pin passing through the through slot and coupling the slider arm to the female ferrule in a location external to and adjacent a first perimeter of the substantially cylindrical female body of the female ferrule; and
a fixed assembly having a male ferrule having a substantially cylindrical male body, the male ferrule coupling to a second of the rod segments at the first end of the substantially cylindrical male body, the male ferrule having a dowel opposite the second rod segment coupled to a second end of the substantially cylindrical male body configured for mating with the dowel cavity of the female ferrule, the fixed assembly having a second pivoting pin extending from an outwardly facing surface of the substantially cylindrical male body of the male ferrule, the second pivoting pin passing through an aperture in a second of the pair of solid ends and coupling the slider arm to the male ferrule in a location external to and adjacent a second perimeter of the substantially cylindrical male body of the male ferrule; and
inserting the dowel into the dowel cavity to couple the rod segments, the first pivoting pin moving through the through slot during the inserting.

19. A method according to claim 18 further comprising:
rotating the slider arm and the attached rotating assembly around the second pivoting pin until the dowel is substantially aligned with the dowel cavity, the first pivoting pin moving through the through slot during the rotating.

20. A method according to claim 18 further comprising:
locking the dowel in place in the dowel cavity via use of a locking device.

21. A method according to claim 18 further comprising:
removing the dowel from the dowel cavity; and
rotating the slider arm and the attached rotating assembly around the second pivoting pin until the first rod segment is substantially parallel to the second rod segment, the first pivoting pin moving through the through slot during the rotating.

22. The apparatus according to claim 18, wherein at least one of the group consisting of the dowel and the dowel cavity have substantially circular cross sections.

23. The apparatus according to claim 18, wherein the dowel is held within the dowel cavity via the frictional force exerted by the dowel on an internal wall of the dowel cavity.

\* \* \* \* \*